US012249164B2

(12) United States Patent
Yasui et al.

(10) Patent No.: US 12,249,164 B2
(45) Date of Patent: Mar. 11, 2025

(54) TRAINING DEVICE, TRAINING METHOD, STORAGE MEDIUM, AND OBJECT DETECTION DEVICE

(71) Applicant: HONDA MOTOR CO., LTD., Tokyo (JP)

(72) Inventors: Yuji Yasui, Wako (JP); Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 17/701,727

(22) Filed: Mar. 23, 2022

(65) Prior Publication Data

US 2022/0319198 A1    Oct. 6, 2022

(30) Foreign Application Priority Data

Mar. 30, 2021  (JP) ................................. 2021-057102

(51) Int. Cl.
| | |
|---|---|
| G06V 20/56 | (2022.01) |
| B60W 40/06 | (2012.01) |
| G06F 18/214 | (2023.01) |
| G06V 10/82 | (2022.01) |

(52) U.S. Cl.
CPC ........... G06V 20/588 (2022.01); B60W 40/06 (2013.01); G06F 18/214 (2023.01); *B60W 2420/403* (2013.01); *B60W 2552/20* (2020.02)

(58) Field of Classification Search
CPC ........ G06V 20/58; G06V 10/82; G06V 20/00; G06V 10/00; G06V 20/588; G06V 10/774; B60W 40/11; B60W 40/04; B60W 40/06; B60W 2420/403; B60W 2552/20; G06F 18/00; G06F 18/214; G06T 7/00;

(Continued)

(56) References Cited

U.S. PATENT DOCUMENTS

| | | | | |
|---|---|---|---|---|
| 2008/0317287 | A1* | 12/2008 | Haseyama | G06V 20/58 |
| | | | | 382/103 |
| 2014/0176551 | A1 | 6/2014 | Heisele | |
| 2018/0308281 | A1* | 10/2018 | Okoyama | G06V 20/64 |

(Continued)

FOREIGN PATENT DOCUMENTS

| | | |
|---|---|---|
| CN | 110070050 | 7/2019 |
| JP | 2011-182260 | 9/2011 |

(Continued)

OTHER PUBLICATIONS

Japanese Office Action for Japanese Patent Application No. 2021-057102 mailed Sep. 10, 2024.

(Continued)

*Primary Examiner* — Ming Y Hon
(74) *Attorney, Agent, or Firm* — Amin, Turocy & Watson, LLP

(57) ABSTRACT

A training device includes a storage device that has stored a program, and a hardware processor, in which the hardware processor executes the program stored in the storage device, thereby acquiring a captured image of a road, adding a computer graphic image of an object present on a road to an actually captured image based on the captured image, and training parameters of a model to output a type of the object when an image is input using a type of the added computer graphic image as teacher data.

11 Claims, 13 Drawing Sheets

(58) Field of Classification Search
CPC ... G06T 15/005; G06T 15/50; G06T 2200/04; G06N 20/00
See application file for complete search history.

(56) References Cited

U.S. PATENT DOCUMENTS

| | | | |
|---|---|---|---|
| 2020/0074231 A1 | 3/2020 | Ishii et al. | |
| 2020/0090004 A1 | 3/2020 | Takeyasu et al. | |
| 2020/0273214 A1* | 8/2020 | Xu | G06N 3/08 |
| 2020/0273435 A1* | 8/2020 | Shibata | G09G 5/38 |
| 2022/0203883 A1* | 6/2022 | Prat | B60Q 1/143 |
| 2024/0370735 A1* | 11/2024 | Ohkawa | G06T 7/00 |
| 2024/0375677 A1* | 11/2024 | Thompson | B60W 60/001 |

FOREIGN PATENT DOCUMENTS

| | | | |
|---|---|---|---|
| JP | 2014-123366 | 7/2014 | |
| JP | 2014-164615 | 9/2014 | |
| JP | 2015-102449 | 6/2015 | |
| JP | 2015518600 A * | 7/2015 | G06V 20/56 |
| JP | 2020-038605 | 3/2020 | |
| JP | 2020-046706 | 3/2020 | |
| JP | 2020-149086 | 9/2020 | |
| KR | 20190099088 A * | 8/2019 | G06V 20/56 |
| WO | 2017/171005 | 10/2017 | |

OTHER PUBLICATIONS

Chinese Office Action for Chinese Patent Application No. 202210123471.6 mailed Dec. 20, 2024.

* cited by examiner

FIG. 5
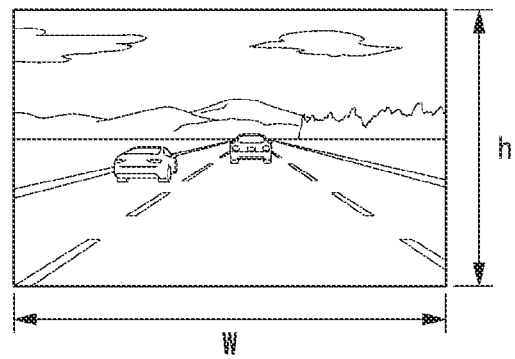
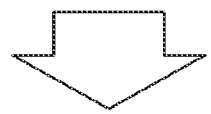
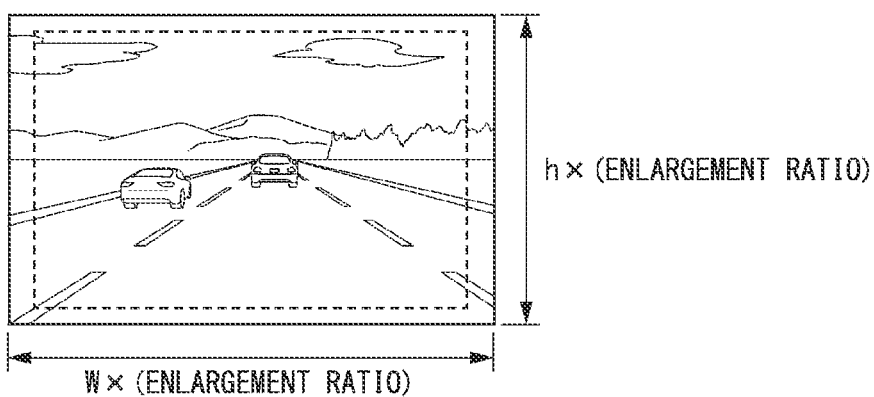
ENLARGE AT ENLARGEMENT RATIO BASED ON SPEED
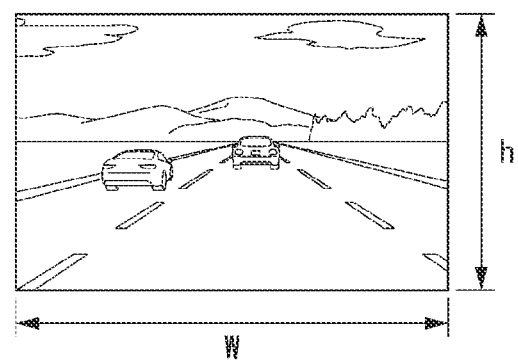
TRIM EDGE TO RESTORE TO ORIGINAL SIZE

TRAINING DEVICE, TRAINING METHOD, STORAGE MEDIUM, AND OBJECT DETECTION DEVICE

CROSS-REFERENCE TO RELATED APPLICATION

Priority is claimed on Japanese Patent Application No. 2021-057102, filed Mar. 30, 2021, the content of which is incorporated herein by reference.

BACKGROUND

Field of the Invention

The present invention relates to a training device, a training method, a storage medium, and an object detection device.

Description of Related Art

Conventionally, a technology of creating teacher data for training about a 3D graphic drawn by a rendering unit and causing a deep learning recognition unit to perform learning is disclosed (PCT International Publication No. WO2017/171005).

SUMMARY

In the conventional technology, it may not be possible to suitably generate a trained model for discriminating an object present on a road in a captured image of a camera mounted on a mobile object.

The present invention has been made in view of such circumstances, and an object of the present invention is to provide a training device, a training method, a storage medium, and an object detection device that can suitably generate a trained model for discriminating an object present on a road.

A training device, a training method, a storage medium, and an object detection device according to the present invention have adopted the following configuration.

(1): A training device according to one aspect of the present invention includes a storage device storing a program, and a hardware processor, in which the hardware processor executes the program stored in the storage device to: acquire a captured image of a road, add a computer graphic image of an object present on a road to an actually captured image based on the captured image, and train parameters of a model to output a type of the object when an image is input using a type of the added computer graphic image as teacher data.

(2): In the aspect of (1) described above, the hardware processor estimates a solar radiation direction based on an actually captured image based on the captured image and gives a shadow based on the solar radiation direction to a computer graphic image of the object.

(3): In the aspect of (1) described above, the captured image is a captured image captured by a camera mounted on a mobile object, and the hardware processor estimates a pitching amount of the mobile object at each time of image capturing based on the captured image, and generates the actually captured image by performing first correction for canceling the pitching amount on the captured image.

(4): In the aspect of (3) described above, the hardware processor generates a training image by performing second correction for undoing the first correction on the actually captured image to which the computer graphic image is added, and trains parameters of the model using the training image as training data.

(5): In the aspect of (1) described above, the captured image is a captured image captured by a camera mounted on a mobile object, the actually captured image is the captured image, and the hardware processor estimates a pitching amount of the mobile object at each time of image capturing based on the captured image, and adds the computer graphic image to a position corresponding to the pitching amount in the actually captured image.

(6): In the aspect of (1) described above, the captured image is a captured image captured by a camera mounted on a mobile object, a movement acquisition unit that acquires a movement amount of the mobile object is further included, and the hardware processor determines a position and a size of the computer graphic image based on the movement amount of the mobile object.

(7): A training method according to another aspect of the present invention is a training method executed using a computer, and includes acquiring a captured image of a road, adding a computer graphic image of an object present on a road to an actually captured image based on the captured image, and training parameters of a model to output a type of the object when an image is input by using a type of the added computer graphic image as teacher data.

(8): A storage medium according to still another aspect of the present invention is a computer-readable non-transitory storage medium that has stored a program causing a computer to: acquire a captured image of a road, add a computer graphic image of an object present on a road to an actually captured image based on the captured image, and train parameters of a model to output a type of the object when an image is input by using a type of the added computer graphic image as teacher data.

(9): An object detection device according to still another aspect of the present invention is an object detection device mounted on a mobile object, by inputting a captured image of at least a road in a traveling direction of the mobile object, captured by a camera mounted on the mobile object, to the trained model trained by the training device according to any one of the aspects (1) described above, discriminates whether an object on the road reflected in the captured image is an object with which the mobile object needs to avoid contact.

(10): A training device according to still another aspect of the present invention includes a storage device storing a program, and a hardware processor, in which the hardware processor executes the program stored in the storage device to: acquire a captured image of a road, add a computer graphic image of an object present on a road to an actually captured image based on the captured image, and train parameters of a model to output a position of the object when an image is input by using a position of the added computer graphic image as teacher data.

(11): A training method according to still another aspect of the present invention is a training method executed by using a computer, and includes acquiring a captured image of a road, adding a computer graphic image of an object present on a road to an actually captured image based on the captured image, and training parameters of a model to output a position of the object when an image is input by using a position of the added computer graphic image as teacher data.

(12): A storage medium according to still another aspect of the present invention is a computer-readable non-transitory storage medium that has stored a program causing a computer to: acquire a captured image of a road, add a computer graphic image of an object present on a road to an actually captured image based on the captured image, and train parameters of a model to output a position of the object when an image is input by using a position of the added computer graphic image as teacher data.

According to the aspects of (1) to (8), (10) to (12) described above, it is possible to suitably generate a trained model for discriminating an object present on a road.

According to the aspect of (9) described above, it is possible to appropriately discriminate an object on a road by using a trained model that has been suitably trained.

BRIEF DESCRIPTION OF THE DRAWINGS

FIG. 5 is a diagram for describing contents of area correction.

DESCRIPTION OF EMBODIMENTS

Hereinafter, an embodiment of a training device, a training method, a storage medium, and an object detection device of the present invention will be described with reference to the drawings. The training device is a device that generates a trained model for object discrimination used by the object detection device mounted on a mobile object. The mobile object can be, for example, a four-wheeled vehicle, a two-wheeled vehicle, a micromobility, a robot, or the like that moves by itself, or a portable device such as a smartphone that is placed on a mobile object that moves by itself or that moves by being carried by a person. In the following description, it is assumed that the mobile object is a four-wheeled vehicle, and the mobile object is referred to as a "vehicle" for description.

[Training Device]

Figure 1:
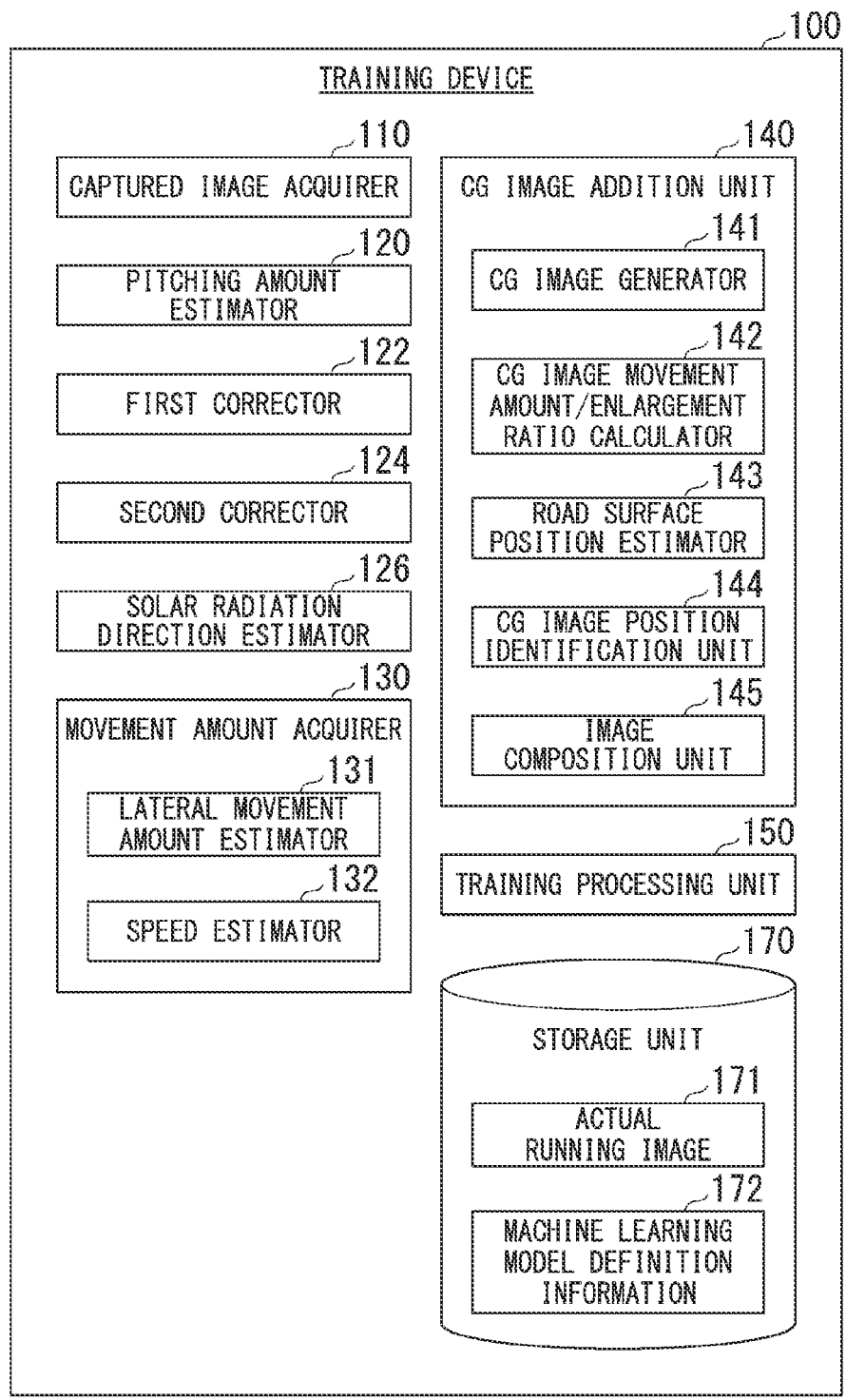
FIG. 1 is a diagram which shows an example of a configuration of a training device.

FIG. 1 is a diagram which shows an example of a configuration of the training device 100. An object detection device 200 includes, for example, a captured image acquirer 110, a pitching amount estimator 120, a first corrector 122, a second corrector 124, a solar radiation direction estimator 126, a movement amount acquirer 130, and a computer graphic (CG) image addition unit 140, a training processing unit 150, and a storage unit 170. The movement amount acquirer 130 includes, for example, a lateral movement amount estimator 131 and a speed estimator 132. The CG image addition unit 140 includes, for example, a CG image generator 141, a CG image movement amount/enlargement ratio calculator 142, a road surface position estimator 143, a CG image position identification unit 144, and an image composition unit 145. Each part other than the storage unit 170 is realized by, for example, a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), a graphics processing unit (GPU) or may be realized by software and hardware in cooperation. A program may be stored in advance in a storage device (a storage device having a non-transitory storage medium) such as a hard disk drive (HDD) or a flash memory, or may be stored in a removable storage medium (non-transitory storage medium) such as a DVD or a CD-ROM and be installed by the storage medium being mounted in a drive device. The storage unit 170 stores data and information such as an actual running image 171 and machine learning model definition information 172.

The captured image acquirer 110 acquires, for example, a captured image captured by a camera mounted in a vehicle while the vehicle is moving (naturally including a temporary stop), which is a captured image in which at least a road in a traveling direction of the vehicle is captured. The captured image is a moving image in which images are arranged in chronological order. The captured image may be an image captured by a camera for fixed point observation, or may be an image captured by a camera of a smartphone. For example, the actual running image 171 stored in the storage unit 170 is an example of this captured image. The captured image acquirer 110 reads the actual running image 171 from the storage unit 170 and provides it to other functional units (for example, expands it to a shared area of a random access memory (RAM)). The actual running image 171 is an image captured with the movement of a vehicle in the vehicle equipped with a camera that captures an image on a traveling direction side. The actual running image 171 may be provided to the training device 100 via a network such as a wide area network (WAN) or a local area network (LAN) by an in-vehicle communication device, or may be carried to the training device 100 by various portable storage devices and stored in the storage unit 170.

Figure 2:
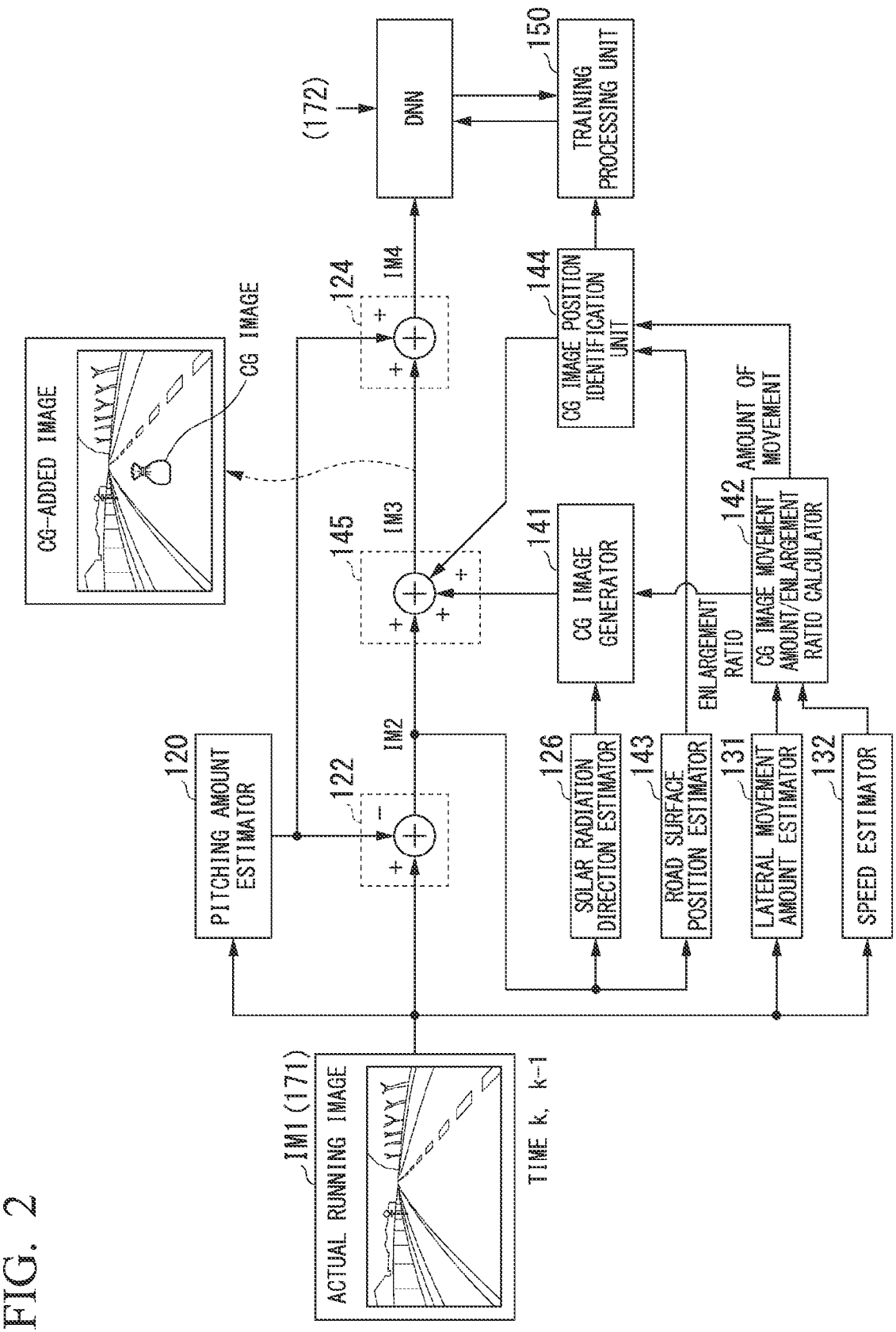
FIG. 2 is a diagram which exemplifies a flow of processing by each part of the training device.

Subsequent processing of functional units will be described with reference to FIG. 2. FIG. 2 is a diagram that exemplifies a flow of processing by each part of the training device 100. Here, the actual running image 171 is referred to as an actual running image IM1.

The pitching amount estimator 120 estimates the pitching amount of a vehicle at each time of image capturing in the actual running image IM1. The pitching amount estimator 120 compares, for example, the actual running image IM1 at an image capturing time (hereinafter, simply referred to as a time) k with the actual running image IM1 at a time k−1, and estimates the pitching amount of a vehicle between the time k and the time k−1 as the pitching amount at the time k. The pitching amount estimator 120 performs such processing for each time. The pitching amount is the amount of rotation around an axis of the vehicle in a right and left direction.

When there is the pitching amount, shaking occurs in the actual running image IM1 in a vertical direction between the time k and the time k−1, so that it is necessary to perform processing of correcting the pitching amount for processing of the CG image addition unit 140 to be described below. Details of the processing of the pitching amount estimator 120 will be described below.

The first corrector 122 performs a first correction for canceling a vertical fluctuation of an image according to the pitching amount estimated by the pitching amount estimator 120 on the actual running image IM1. For example, the first corrector 122 determines a correction amount of the first correction using a table or a map that defines how much each pixel on an image vertically fluctuates with respect to the pitching amount. An image on which the first correction is performed by the first corrector 122 is referred to as a corrected image IM2. The corrected image IM2 is an example of an "actually captured image based on a captured image."

The second corrector 124 generates a training image IM4 by performing a second correction for undoing the first correction on a CG-added image IM3 in which a CG image is added to the corrected image IM2 by the CG image addition unit 140.

The solar radiation direction estimator 126 estimates the solar radiation direction in a landscape reflected in the actual running image IM1 based on the corrected image IM2. For example, the solar radiation direction estimator 126 recognizes a shadow portion included in the corrected image IM2 and a three-dimensional object that is estimated to have created the shadow in the corrected image IM2, and derives a solar radiation direction in a real space by converting a solar radiation direction based on a positional relationship between the recognized two parts on an image plane into that in the real space.

The movement amount acquirer 130 estimates a movement amount of the vehicle. Specifically, the movement amount acquirer 130 estimates the following two movement amounts.

The lateral movement amount estimator 131 of the movement amount acquirer 130 compares, for example, the actual running image IM1 at the time k and the actual running image IM1 at the time k−1, and estimates the amount of lateral movement of the vehicle between the time k and the time k−1 (referred to as the amount of movement in a direction orthogonal to a vehicle center axis or the amount of movement in a road width direction). Details of the processing of the lateral movement amount estimator 131 will be described below.

The speed estimator 132 of the movement amount acquirer 130 compares, for example, the actual running image IM1 at the time k and the actual running image IM1 at the time k−1 and estimates a speed of the vehicle at the time k. Details of the processing of the speed estimator 132 will be described below.

The CG image addition unit 140 adds a CG image of an object present on a road to the corrected image IM2.

The CG image generator 141 of the CG image addition unit 140 reads, for example, template images of some objects (for example, tires, cardboard boxes, bicycles, steel frames, or the like) that can be present on a road as falling objects or abandoned objects, and with which the vehicle needs to avoid contact, from the storage unit 170, converts or re-renders them into a size according to an enlargement ratio described below, and generates a CG image by adding a shadow based on the solar radiation direction estimated by the solar radiation direction estimator 126. In addition, the CG image generator 141 generates a CG image of an object with which the vehicle does not need to avoid contact, such as road surface markings, manholes, and road surface materials. The CG image generator 141 generates CG images for road surface markings that are not collected as captured images, faint road surface markings, and falling objects that appear at a high frequency at various angles and states (being crushed, cracked, dirty, and the like). As a result, as compared to a case of generating a trained model only using a captured image, a range covered by training processing can be expanded, a probability of being recognized as an untrained object can be reduced, and erroneous avoidance in a vehicle can be suppressed.

The CG image movement amount/enlargement ratio calculator 142 of the CG image addition unit 140 determines a position and a size of a CG image based on the amount of movement of a vehicle estimated by the movement amount acquirer 130. Specifically, the CG image movement amount/enlargement ratio calculator 142 calculates the position of a CG image at the time k by adding the amount of displacement on an image (calculated by projecting the amount of displacement on an assumed plane viewed from the sky onto an image plane) based on a distance traveled by the vehicle from the time k−1 to the time k and the amount of lateral movement to the position of a CG image at the time k−1. The CG image movement amount/enlargement ratio calculator 142 outputs the calculated position of a CG image at the time k to the CG image position identification unit 144. In addition, the CG image movement amount/enlargement ratio calculator 142 calculates an enlargement ratio of the CG image at the time k−1 based on the distance traveled by the vehicle from the time k−1 to the time k. The CG image movement amount/enlargement ratio calculator 142 outputs the enlargement ratio to the CG image generator 141. The enlargement ratio is a value greater than 1 when the vehicle is moving forward, and is a value less than 1 (that is, reduced) when the vehicle is moving backward.

Figure 3:
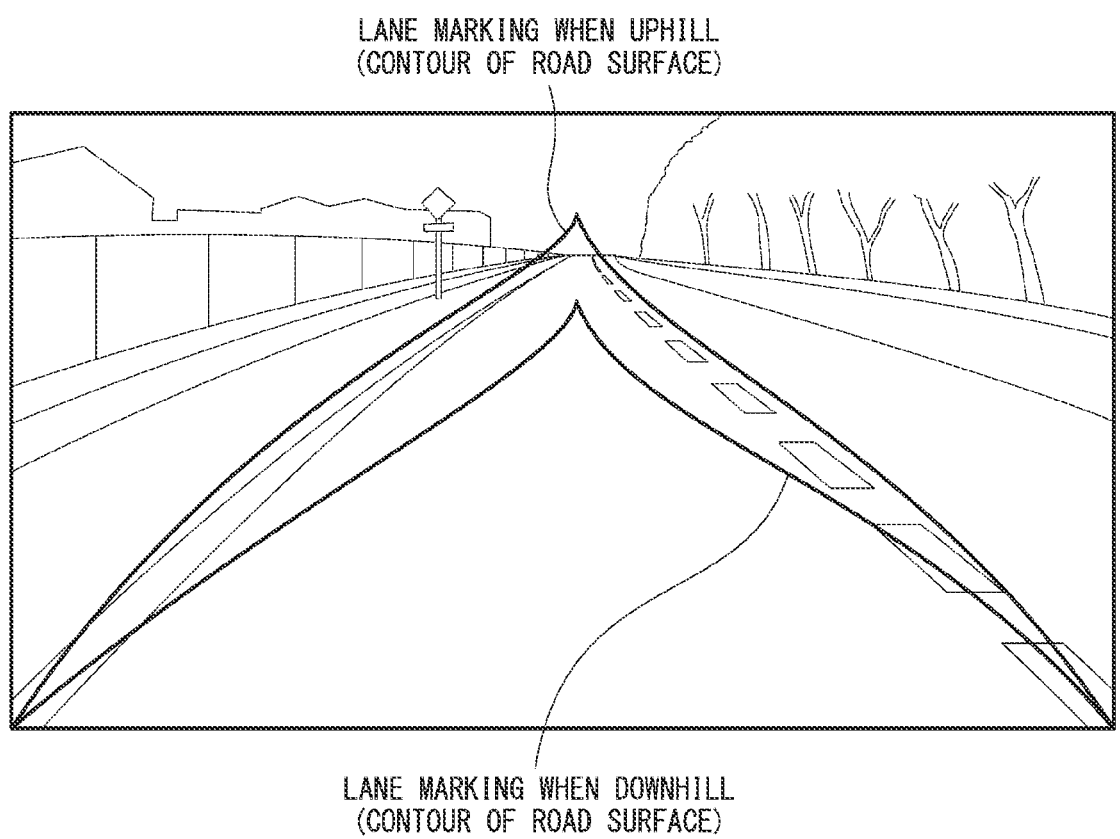
FIG. 3 is a diagram which shows how a position of a road surface in a corrected image changes depending on a gradient.

The road surface position estimator 143 of the CG image addition unit 140 estimates a position of a road surface in the real space in the traveling direction of a mobile object 1 based on the corrected image IM2, and establishes a correspondence relationship between each position on the road surface and each position in the corrected image IM2. FIG. 3 is a diagram which shows how the position of the road surface in the corrected image IM2 changes depending on a gradient. As shown in FIG. 3, when the road surface in the real space in the traveling direction of the mobile object 1 is uphill or downhill (especially when a position where the vehicle is located is flat and a gradient occurs on the traveling direction side), or is curved left and right, the position of the road surface in the corrected image IM2 changes, so that a position on an image to which a CG image needs to be added changes. The road surface position estimator 143 performs the processing described above to recognize the position on the image. Processing of the road surface position estimator 143 may establish a correspondence relationship between each position on the image in an ideal state in which the road surface is horizontal and is not curved and each position on the corrected image IM2 showing an actual state.

The CG image position identification unit 144 of the CG image addition unit 140 identifies the position of the CG image on the image based on the calculated position (corresponding to the position in the ideal state described above) acquired from the CG image movement amount/enlargement ratio calculator 142 and the position of the road surface estimated by the road surface position estimator 143.

The image composition unit 145 of the CG image addition unit 140 superimposes (adds) a CG image generated by the CG image generator 141 on the corrected image IM2 at the position of the CG image identified by the CG image position identification unit 144. As a result, a CG-added image IM3 is generated. The CG image addition unit 140 may erase and overwrite an image of the road surface with respect to the position occupied by the CG image or may add pixel values of the CG image thereto while leaving the image of the road surface.

As described above, the second corrector 124 generates a training image IM4 by performing the second correction for undoing the first correction on the CG-added image IM3.

The training processing unit 150 trains parameters of a machine learning model defined by the machine learning model definition information 172. The machine learning model definition information 172 is information that defines the number of nodes, connection relationships, and the like of the machine learning model. As shown in FIG. 2, the machine learning model is, for example, a deep neural network (DNN). The training processing unit 150 trains the parameters of the machine learning model to output a type of an object (an object with which the vehicle needs to avoid contact) when an image is input, in a method such as backpropagation by using the training image IM4 as training data and a type of the added CG image as teacher data. The machine learning model whose parameters have been trained is used as a trained model in the in-vehicle device. Therefore, it can be said that the training processing unit 150 trains the parameters of the machine learning model Instead (or in addition), the training processing unit 150 may train the parameters of a machine learning model to output a position of an object (an object with which the vehicle needs to avoid contact) when an image is input, in a method such as backpropagation by using the training image IM4 as training data and the position of the added CG image as teacher data.

In the description described above, it is assumed that the CG image addition unit 140 adds a CG image of an object present on a road to the corrected image IM2 in which the first correction for canceling the vertical fluctuation of an image according to the pitching amount estimated by the pitching amount estimator 120 is performed on the actual running image IM1, and the training image IM4 is generated by performing the second correction for undoing the first correction on the CG-added image IM3 to which the CG image is added. Instead, the CG image addition unit 140 may add the CG image at a position obtained by modifying the position of the CG image identified by the CG image position identification unit 144 according to the pitching amount estimated by the pitching amount estimator 120 in the actual running image IM1. In this case, the second correction is unnecessary.

According to the processing described above, a trained model for discriminating objects present on a road can be suitably generated.

Figure 4:
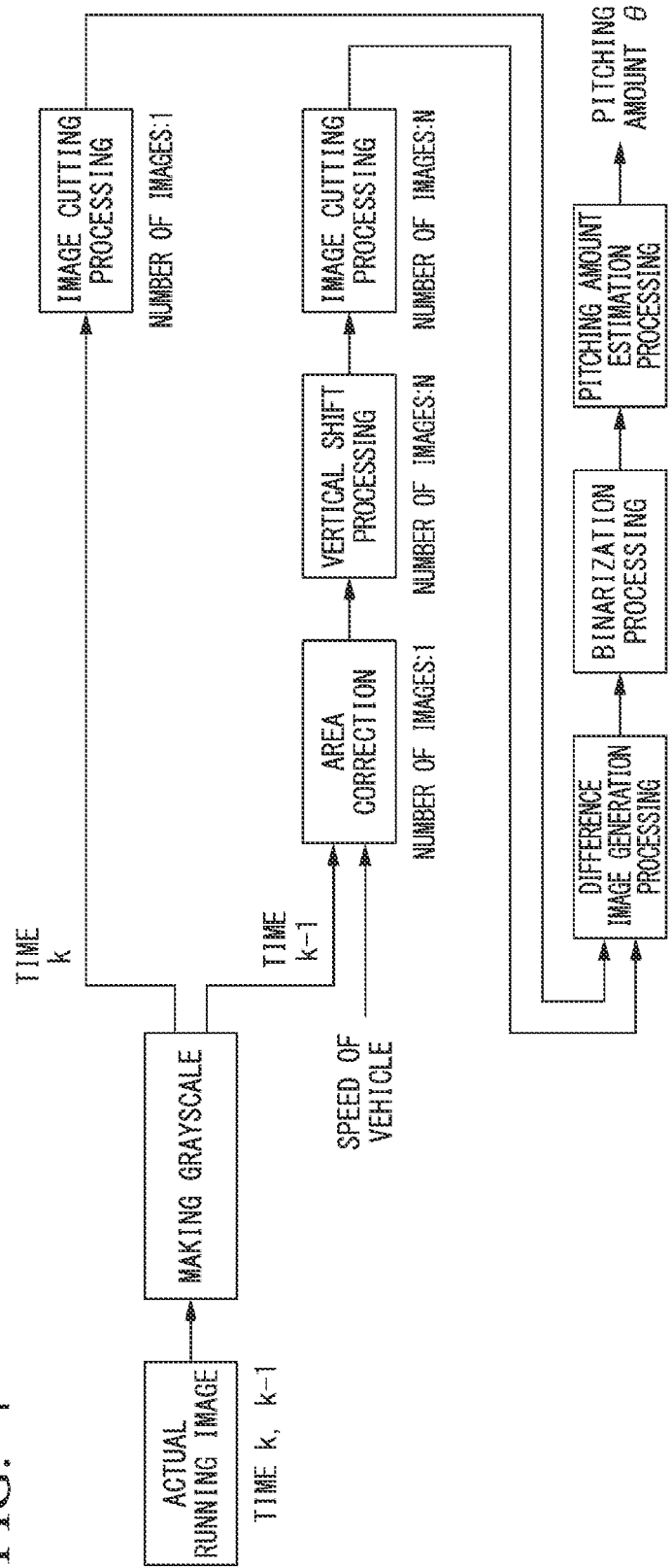
FIG. 4 is a diagram for describing processing of a pitching amount estimator.

In the following description, the processing of the pitching amount estimator 120, the lateral movement amount estimator 131, and the speed estimator 132 will be described in more detail. FIG. 4 is a diagram for explaining the processing of the pitching amount estimator 120. The pitching amount estimator 120 makes the actual running image IM1 at the time k and the time k−1 grayscale, respectively. Hereinafter, the grayscale image is referred to as a grayscale image. The pitching amount estimator 120 performs image cutting processing for deleting and cutting out an unnecessary portion on a grayscale image at the time k.

The pitching amount estimator 120 performs area correction based on the speed of a vehicle on a grayscale image at the time k−1. The speed of a vehicle may be a result of processing of a speed estimator 132 to be described below, or may be a result acquired from a speed sensor together with image capturing by a camera in the vehicle (a result provided with a captured image). FIG. 5 is a diagram for describing contents of the area correction. The pitching amount estimator 120 calculates a distance traveled by the vehicle from the time k−1 to the time k based on the speed of the vehicle, and enlarges the grayscale image at the time k−1 at an enlargement ratio based on the traveled distance (that is, an enlargement ratio based on the speed). This is because, if the vehicle is moving forward, a distance at the time k is closer than that at the time k−1 with respect to a portion where an image of the same place is captured, and the portion is reflected to be enlarged more at the time k. The pitching amount estimator 120 makes the same object appear in the grayscale images at the time k and the time k−1 with the same size due to the area correction, and makes it possible to accurately compare the images. The pitching amount estimator 120 trims top, bottom, right, and left edges of the enlarged image to restore it to its original size.

Figure 6:
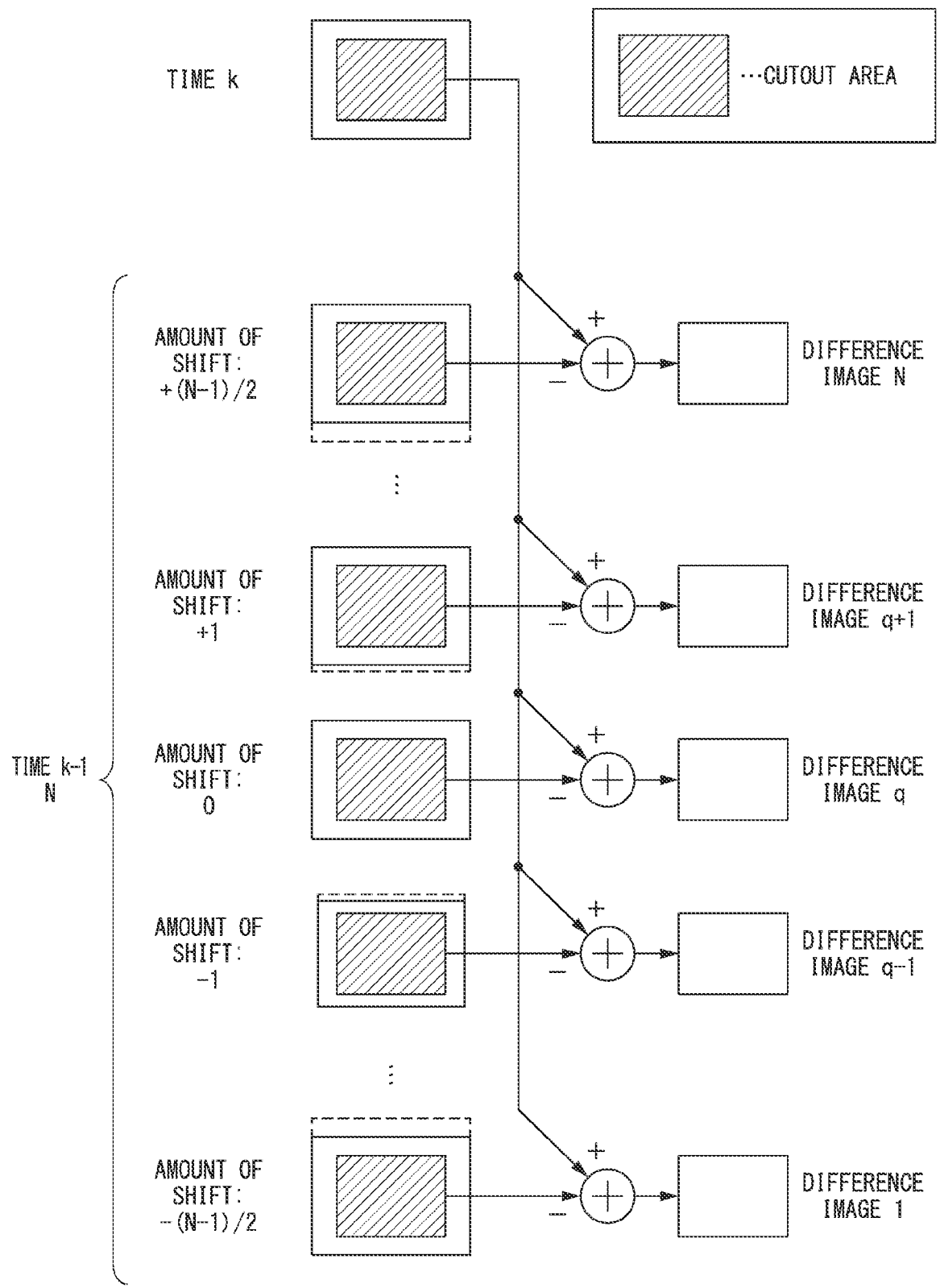
FIG. 6 is a diagram for describing contents of vertical shift processing.
Figure 7:
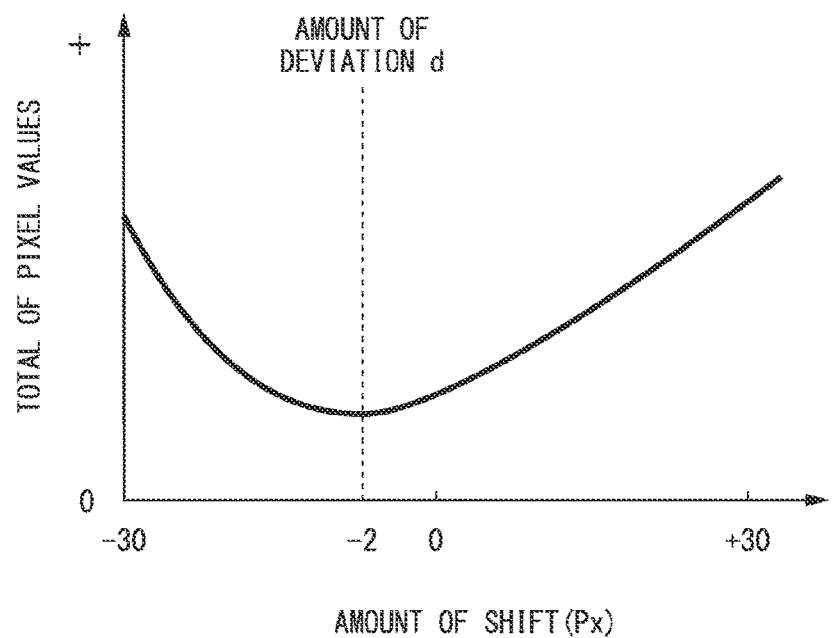
FIG. 7 is a diagram for describing contents of processing of obtaining an amount of deviation.

Returning to FIG. 4, the pitching amount estimator 120 performs vertical shift processing on the grayscale image at the time k−1 at which the area correction is performed, and generates N images. FIG. 6 is a diagram for describing contents of vertical shift processing. The pitching amount estimator 120 generates a plurality of (here, N) comparison target images having different amounts of deviation in each of upward and downward directions for the grayscale image at the time k−1 on which the area correction is performed. In FIG. 4, a broken line indicates the grayscale image before a deviation occurs. Then, N difference images are generated with a difference between pixels set as pixels between an area at a determined position cut out from the grayscale image at the time k (a cutout area) and a cutout area of a comparison target image (difference image generation processing in FIG. 3). Returning to FIG. 4, the pitching amount estimator 120 performs binarization processing of comparing a pixel value of each pixel of the difference images with a threshold value, and assigning a pixel value of one when the pixel value is equal to or greater than the threshold value and assigning a pixel value of zero when the pixel value is less than the threshold value. Then, the pitching amount estimator 120 selects a difference target image having the smallest total pixel value (the largest number of pixels having pixel values of zero), and obtains the amount of deviation at which the difference target image is generated. FIG. 7 is a diagram for describing contents of processing for obtaining the amount of deviation d. In a shown example, a difference target image with respect to the comparison target image, which has the amount of deviation d of minus two, that is, which is shifted downward by two pixels, is selected as the difference target image having the smallest total pixel value.

Figure 8:
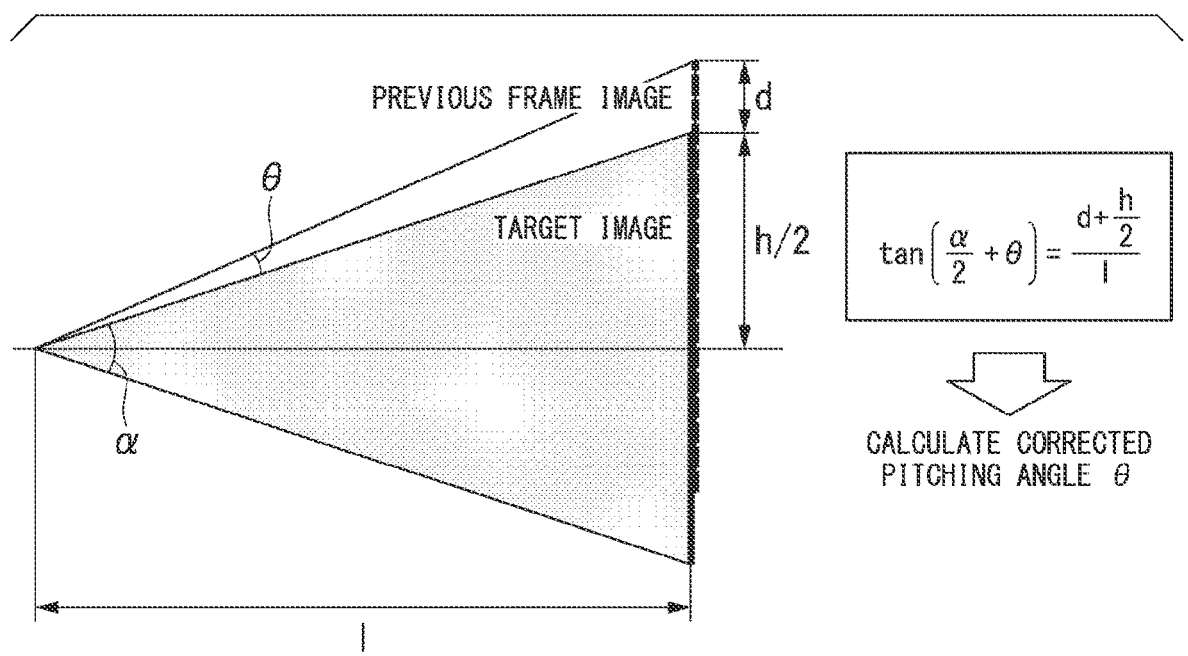
FIG. 8 is a diagram for describing processing of estimating a pitching amount.
Figure 9:
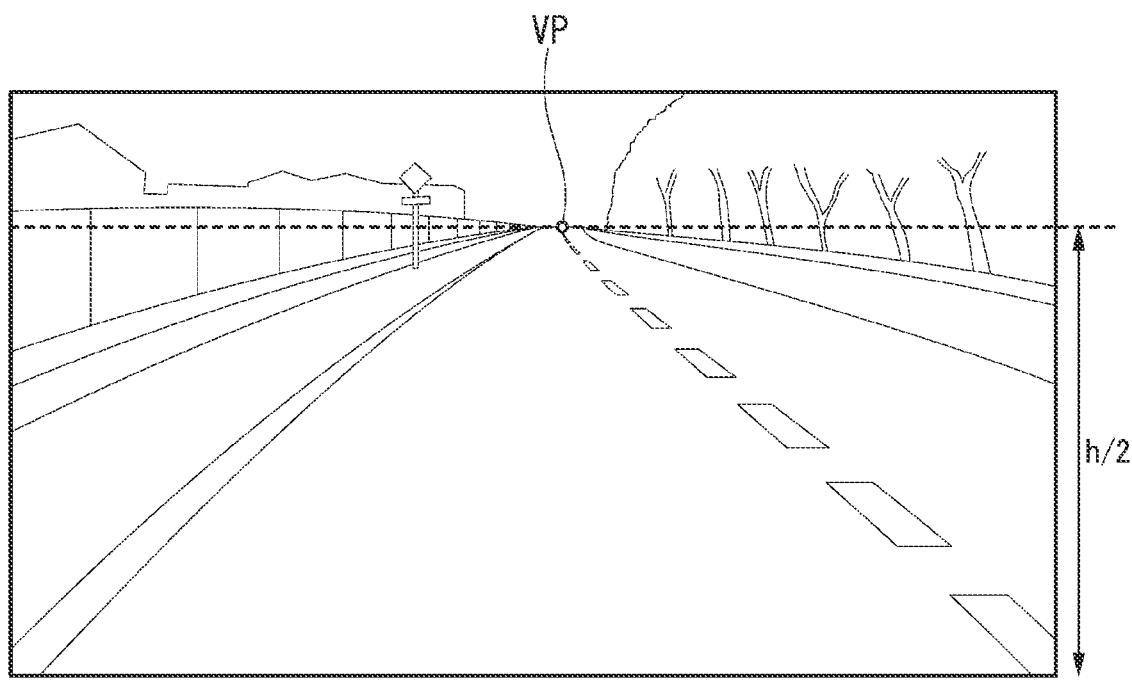
FIG. 9 is a diagram for describing processing of estimating a pitching amount.

Next, the pitching amount estimator 120 estimates the pitching amount based on the amount of deviation d. FIGS. 8 and 9 are diagrams for describing processing of estimating the pitching amount. There is a relationship expressed by the following equation between the amount of deviation d and the pitching amount θ. In the equation, l is a distance to a vanishing point VP in an image in the real space (for example, about 100 to 200 [m]), and h is a value obtained by doubling a height from a lower end of the image to the vanishing point VP. The pitching amount estimator 120 obtains the pitching amount θ based on this equation.

Although h changes depending on a size of the image, the pitching amount θ is used by substantially returning it to the amount of deviation on the image, so that there is no problem in this respect.

$$\tan\{(\alpha/2)+\theta\}=\{d+(h/2)\}/l$$

Figure 10:
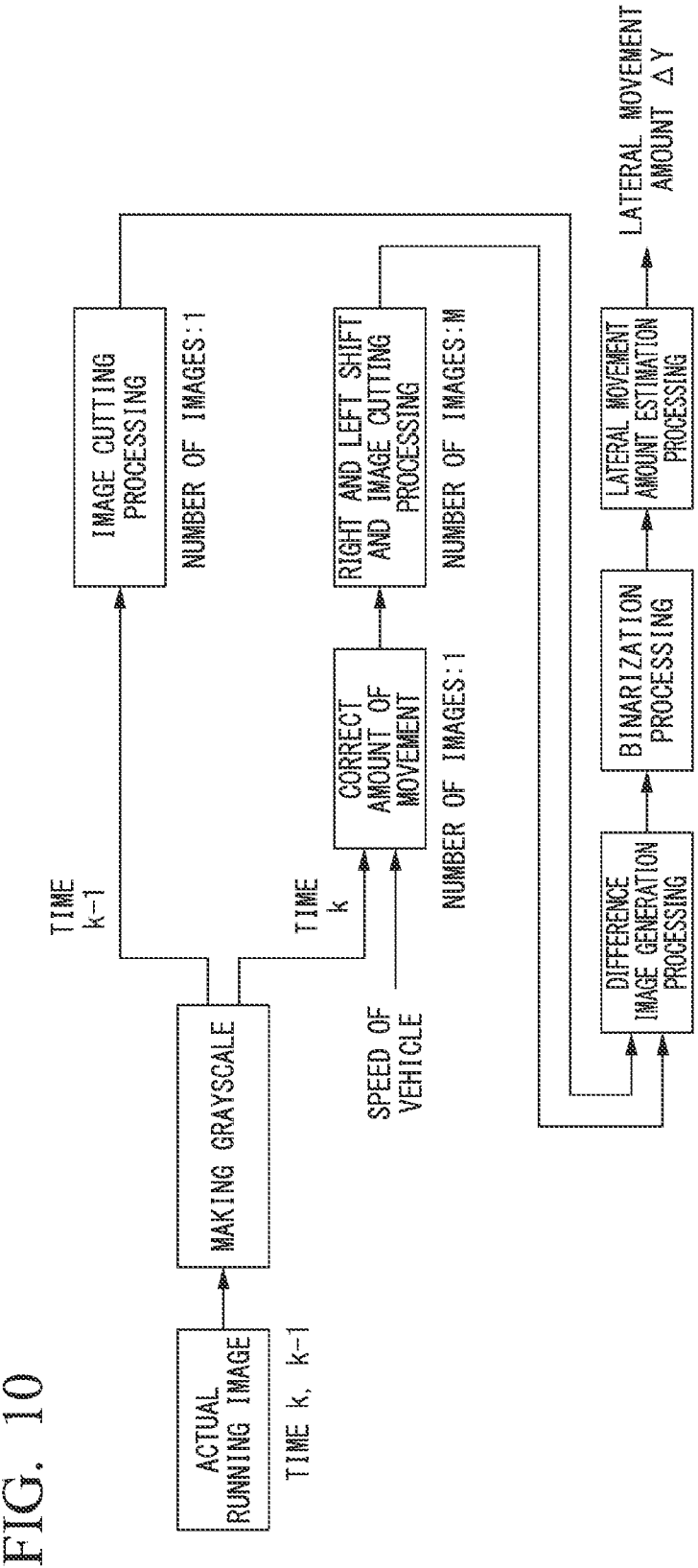
FIG. 10 is a diagram for describing processing of a lateral movement amount estimator.

FIG. 10 is a diagram for describing the processing of the lateral movement amount estimator 131. The lateral movement amount estimator 131 makes the actual running images IM1 at the time k and the time k−1 grayscale, respectively (processing of making grayscale may be shared with the pitching amount estimator 120. The same applies to the speed estimator 132). The lateral movement amount estimator 131 performs image cutting processing of deleting and cutting out an unnecessary portion on the grayscale image at the time k−1.

The lateral movement amount estimator 131 performs area correction based on the speed of the vehicle on the grayscale image at the time k. This has the same meaning as the pitching amount estimator 120, and a direction of enlargement or reduction is the same as that of the pitching amount estimator 120.

Figure 11:
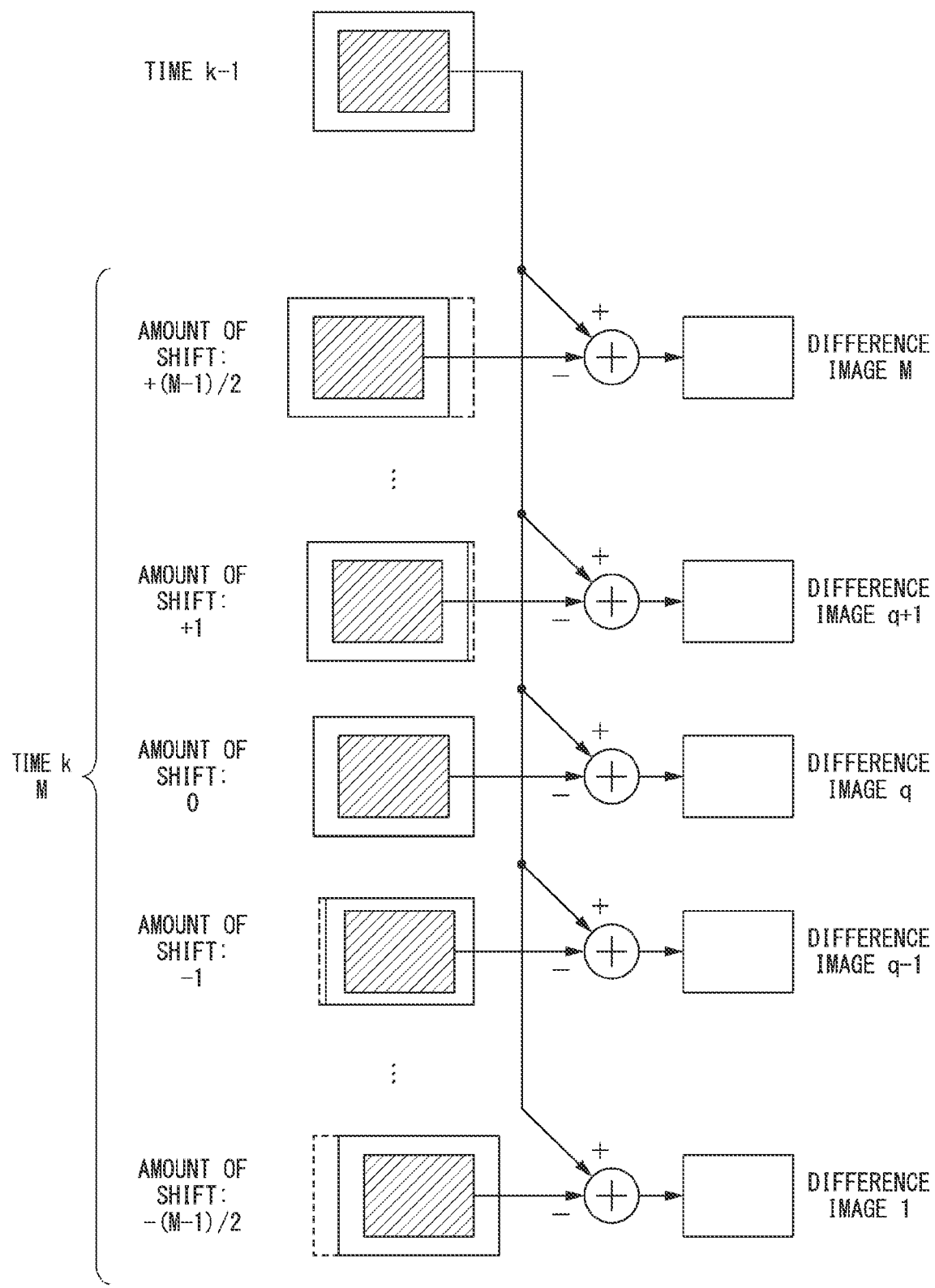
FIG. 11 is a diagram for describing contents of right and left shift and image cutting processing.

The lateral movement amount estimator 131 performs right and left shift and image cutting processing on the grayscale image at the time k on which the area correction is performed, and generates M images. FIG. 11 is a diagram for describing contents of the right and left shift and image cutting processing. The lateral movement amount estimator 131 generates a plurality of (here, M) comparison target images having different amounts of deviation in each of left and right directions for the grayscale image at the time k on which the area correction is performed. In FIG. 11, a broken line indicates the grayscale image before a deviation occurs. Then, M difference images are generated with a difference between pixels as pixels between an area at a determined position cut out from the grayscale image at the time k−1 (a cutout area) and a cut-out area of a comparison target image (difference image generation processing in FIG. 10). Returning to FIG. 10, the lateral movement amount estimator 131 performs binarization processing of comparing a pixel value of each pixel of the difference images with a threshold value, and assigning a pixel value of one when the pixel value is equal to or greater than the threshold value and assigning a pixel value of zero when the pixel value is less than the threshold value. Then, the lateral movement amount estimator 131 selects a difference target image having the smallest total pixel value (the largest number of pixels having pixel values of zero), and obtains the amount of lateral movement ΔY based on the amount of shift at which the difference target image is generated.

Figure 12:
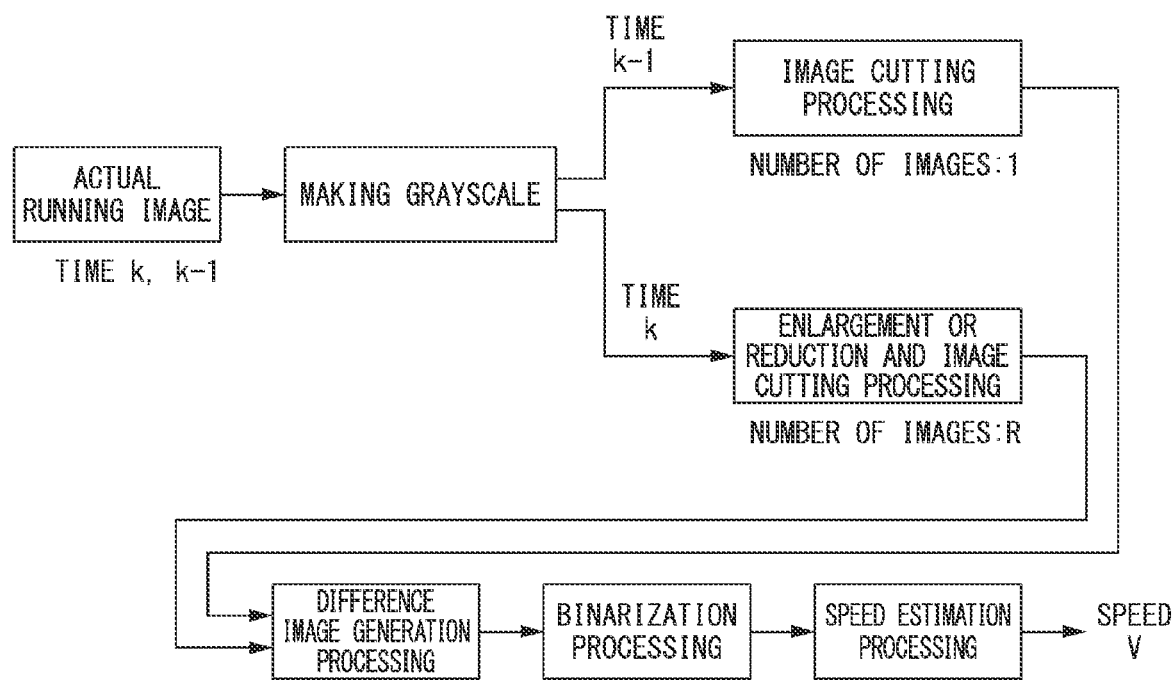
FIG. 12 is a diagram for describing processing of a speed estimator.

FIG. 12 is a diagram for describing the processing of the speed estimator 132. The speed estimator 132 makes the actual running image IM1 at the time k and the time k−1 grayscale, respectively. The speed estimator 132 performs image cutting processing of deleting and cutting out an unnecessary portion on the grayscale image at the time k−1.

Figure 13:
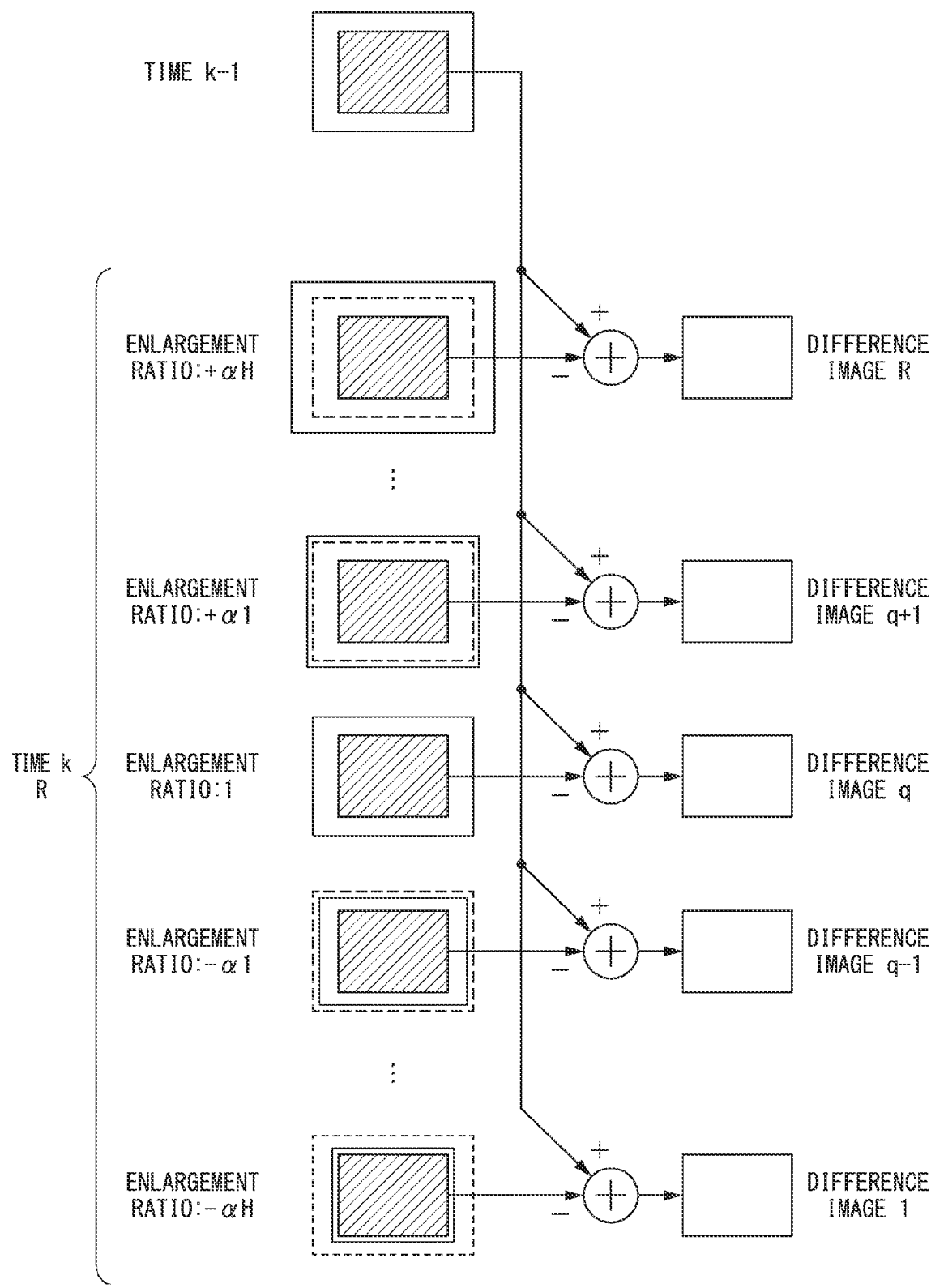
FIG. 13 is a diagram for describing contents of enlargement or reduction and image cutting processing.

The speed estimator 132 performs enlargement or reduction and image cutting processing on the grayscale image at the time k, and generates R images. FIG. 13 is a diagram for describing contents of the enlargement or reduction and image cutting processing. The speed estimator 132 generates a plurality of (here, R) comparison target images having different enlargement ratios (reduction rates) in each of an enlargement direction and a reduction direction for the grayscale image at the time k. In FIG. 13, a broken line indicates the grayscale image before it is enlarged or reduced. Then, R difference images are generated with a difference between pixels as pixels between an area at a determined position cut out from the grayscale image at the time k−1 (a cutout area) and a cut-out area of a comparison target image (difference image generation processing in FIG. 10). Returning to FIG. 12, the speed estimator 132 performs binarization processing of comparing a pixel value of each pixel of the difference images with a threshold value, and assigning a pixel value of one when the pixel value is equal to or greater than the threshold value and assigning a pixel value of zero when the pixel value is less than the threshold value. Then, the speed estimator 132 selects a difference target image having the smallest total pixel value (the largest number of pixels having pixel values of zero), and obtains a speed V based on an enlargement ratio (a reduction rate) at which the difference target image is generated.

According to the embodiment of the training device described above, it is possible to suitably generate a trained model for discriminating an object present on a road by including the captured image acquirer 110 configured to acquire a captured image captured by a camera mounted in a mobile object while the mobile object is moving, which is a captured image in which at least a road in the traveling direction of the mobile object is captured, the CG image addition unit 140 configured to add a computer graphic image of an object present on a road to the actually captured image IM2 based on the captured image, the training processing unit 150 configured to train parameters of a model to output a position of an object when an image is input by using a position of the added computer graphic image as teacher data.

[Object Detection Device]

Hereinafter, an embodiment of the object detection device using a trained model generated by the training device 100 will be described. The object detection device is, for example, mounted on a mobile object. The mobile object is, for example, a four-wheeled vehicle, a two-wheeled vehicle, a micromobility, a robot, or the like. In the following description, it is assumed that the mobile object is a four-wheeled vehicle, and the mobile object is referred to as a "vehicle" for description.

Figure 14:
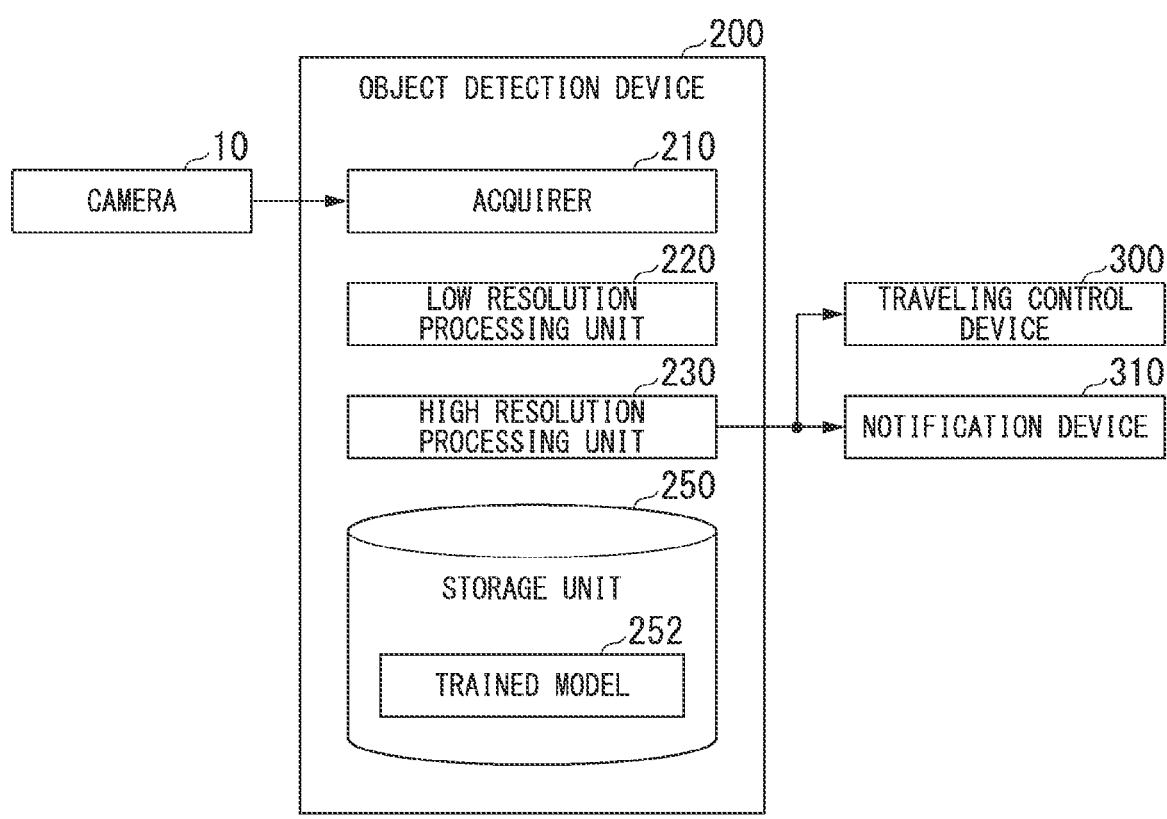
FIG. 14 is a diagram which shows an example of a configuration and a use environment of an object detection device.

FIG. 14 is a diagram which shows an example of a configuration and a use environment of the object detection device 200. The object detection device 200 communicates with the camera 10, the traveling control device 300, the notification device 310, and the like.

The camera 10 is attached to a back surface of a windshield of a vehicle, captures an image of at least a road in the traveling direction of the vehicle, and outputs a captured image to the object detection device 200. A sensor fusion device or the like may be interposed between the camera 10 and the object detection device 200, but description thereof will be omitted.

The traveling control device 300 is, for example, an automatic driving control device for autonomously driving a vehicle, a driving support device for performing inter-vehicle distance control, automatic brake control, automatic lane change control, or the like. The notification device 310 is a speaker, a vibrator, a light emitting device, a display device, or the like for outputting information to an occupant of a vehicle.

The object detection device 200 includes, for example, an acquirer 210, a low resolution processing unit 220, a high resolution processing unit 230, and a storage unit 250. A trained model 252 trained by the training device 100 is stored in the storage unit 250. Each of the acquirer 210, the low resolution processing unit 220, and the high resolution processing unit 230 is realized by, for example, a hardware processor such as a CPU executing a program (software). Some or all of these components may be realized by hardware (a circuit unit; including circuitry) such as LSI, an ASIC, an FPGA, or a GPU, or may also be realized by software and hardware in cooperation. A program may be stored in advance in a storage device (a storage device having a non-transitory storage medium) such as an HDD or a flash memory, or may be stored in a removable storage medium (a non-transitory storage medium) such as a DVD or a CD-ROM and installed by the storage medium being mounted in a drive device.

The acquirer 210 acquires a captured image from the camera 10. The acquirer 210 stores the acquired captured image (data) in a working memory such as a RAM.

The low resolution processing unit 220 performs thinning-out processing on a captured image to generate a low-resolution image whose image quality is lower than that of the captured image. A low-resolution image is, for example, an image having the number of pixels smaller than that of the captured image. The low resolution processing unit 220 extracts, for example, an area including a characteristic portion in a low-resolution image and outputs it to the high resolution processing unit 230 as a point of interest. There are no particular restrictions on a specific example of the processing of extracting this area, and any method may be adopted.

The high resolution processing unit 230 cuts out a portion corresponding to the point of interest in the captured image, and inputs an image of this portion to the trained model 252. In the trained model 252, it is discriminated whether the image reflected on the point of interest is a road surface marking, a falling object (trained using a CG image in the training device 100), or is unknown (an untrained object).

A result of the discrimination by the high resolution processing unit 230 is output to the traveling control device 300 and/or the notification device 310. The traveling control device 300 performs automatic braking control, automatic steering control, or the like to avoid contact between objects (actually areas on an image) that are discriminated as "falling objects" and objects that are unknown (untrained objects) and a vehicle. The notification device 310 outputs an alarm in various methods when time to collision (TTC) between an object (same as above) discriminated as a "falling object" and a vehicle is less than a threshold value.

According to the embodiment of the object detection device described above, it is possible to appropriately discriminate an object on a road by using the trained model 252 that has been suitably trained.

Although a form for implementing the present invention has been described above using the embodiment, the present invention is not limited to the embodiment, and various modifications and substitutions can be made within a range not departing from the gist of the present invention.

What is claimed is:

1. A training device comprising:
a storage device storing a program; and
a hardware processor,
wherein the hardware processor executes the program stored in the storage device to:
acquire a captured image of a road which is captured by a camera mounted on a mobile object;
estimate a pitching amount of the mobile object at each time of image capturing based on the captured image;
generate an actually captured image by performing first correction for canceling the pitching amount on the captured image;
add a computer graphic image of an object present on a road to the actually captured image based on the captured image;
generate a training image by performing second correction for undoing the first correction on the actually captured image to which the computer graphic image is added; and
train parameters of a model to output a type of the object when an image is input using the training image as training data and using a type of the added computer graphic image as teacher data.

2. The training device according to claim 1,
wherein the hardware processor estimates a solar radiation direction based on the actually captured image based on the captured image and gives a shadow based on the solar radiation direction to a computer graphic image of the object.

3. The training device according to claim 1,
wherein the captured image is a captured image captured by the camera mounted on the mobile object, and
the hardware processor acquires a movement amount of the mobile object, and determines a position and a size of the computer graphic image based on the movement amount of the mobile object.

4. An object detection device is an object detection device mounted on the mobile object, and, by inputting a captured image of at least a road in a traveling direction of the mobile object, captured by the camera mounted on the mobile object, to the trained model trained by the training device according to any one of claims claim 1, discriminates whether an object on the road reflected in the captured image is an object with which the mobile object needs to avoid contact.

5. The training device according to claim 1,
wherein the hardware processor compares a first captured image at a first image capturing time with a second captured image at a second image capturing time before the first image capturing time in each time of image capturing, and estimates the pitching amount of the mobile object between the first image capturing time and the second image capturing time as the pitching amount at the first image capturing time.

6. The training device according to claim 1,
wherein the hardware processor determines a correction amount of the first correction using a table or a map that defines how much each pixel on a captured image vertically fluctuates with respect to the pitching amount.

7. A training method executed using a computer, comprising:
acquiring a captured image of a road which is captured by a camera mounted on a mobile object;
estimating a pitching amount of the mobile object at each time of image capturing based on the captured image;
generating an actually captured image by performing first correction for canceling the pitching amount on the captured image;
adding a computer graphic image of an object present on a road to the actually captured image based on the captured image;
generating a training image by performing second correction for undoing the first correction on the actually captured image to which the computer graphic image is added; and
training parameters of a model to output a type of the object when an image is input by using the training image as training data and using a type of the added computer graphic image as teacher data.

8. A computer-readable non-transitory storage medium that has stored a program causing a computer to:
acquire a captured image of a road which is captured by a camera mounted on a mobile object;
estimate a pitching amount of the mobile object at each time of image capturing based on the captured image;
generate an actually captured image by performing first correction for canceling the pitching amount on the captured image;
add a computer graphic image of an object present on a road to the actually captured image based on the captured image;
generate a training image by performing second correction for undoing the first correction on the actually captured image to which the computer graphic image is added; and
train parameters of a model to output a type of the object when an image is input by using the training image as training data and using a type of the added computer graphic image as teacher data.

9. A training device comprising:
a storage device that has storing a program; and
a hardware processor,
wherein the hardware processor executes the program stored in the storage device to:
acquire a captured image of a road which is captured by a camera mounted on a mobile object:
estimate a pitching amount of the mobile object at each time of image capturing based on the captured image;
generate an actually captured image by performing first correction for canceling the pitching amount on the captured image;
add a computer graphic image of an object present on a road to the actually captured image; based on the captured image,
generate a training image by performing second correction for undoing the first correction on the actually captured image to which the computer graphic image is added; and
train parameters of a model to output a position of the object when an image is input by using the training image as training data and using a position of the added computer graphic image as teacher data.

10. A training method executed using a computer, comprising:
acquiring a captured image of a road which is captured by a camera mounted on a mobile object:
estimating a pitching amount of the mobile object at each time of image capturing based on the captured image;
generating an actually captured image by performing first correction for canceling the pitching amount on the captured image;
adding a computer graphic image of an object present on a road to the actually captured image; based on the captured image,
generating a training image by performing second correction for undoing the first correction on the actually captured image to which the computer graphic image is added; and
training parameters of a model to output a position of the object when an image is input by using the training image as training data and using a position of the added computer graphic image as teacher data.

11. A computer-readable non-transitory storage medium that has stored a program causing a computer to:
acquire acquiring a captured image of a road which is captured by a camera mounted on a mobile object;
estimate a pitching amount of the mobile object at each time of image capturing based on the captured image;
generate an actually captured image by performing first correction for canceling the pitching amount on the captured image;
add adding a computer graphic image of an object present on a road to the actually captured image based on the captured image;
generate a training image by performing second correction for undoing the first correction on the actually captured image to which the computer graphic image is added; and
train training parameters of a model to output a position of the object when an image is input by using the training image as training data and using a position of the added computer graphic image as teacher data.

* * * * *